United States Patent [19]

Meunier et al.

[11] 4,183,832

[45] Jan. 15, 1980

[54] AQUEOUS SOLUTIONS OF ETHERIFIED MELAMINE-FORMALDEHYDE RESINS WITH LONG SHELF LIFE AND LOW FREE FORMALDEHYDE CONTENT

[75] Inventors: Jean-Paul Meunier, Clermont; Jacky Joachim; Bernard Kafka, both of Rantigny, all of France

[73] Assignee: Saint-Gobain Industries, Neuilly-sur-Seine, France

[21] Appl. No.: 898,113

[22] Filed: Apr. 20, 1978

Related U.S. Application Data

[63] Continuation of Ser. No. 681,844, Apr. 30, 1976, abandoned.

[30] Foreign Application Priority Data

Apr. 30, 1975 [FR] France .............. 75 13569

[51] Int. Cl.$^2$ .............................................. C08L 5/00
[52] U.S. Cl. ..................................... 260/17.3; 528/254
[58] Field of Search ........................ 260/17.3, 67.6 R; 528/254

[56] References Cited

U.S. PATENT DOCUMENTS

| 2,197,357 | 4/1940 | Widmer | 260/67.6 |
| 2,315,401 | 3/1943 | D'Alelio | 260/67.6 |
| 2,485,059 | 10/1949 | Mohrman et al. | 260/67.6 |
| 2,577,767 | 12/1951 | Jones | 528/254 |
| 2,684,347 | 7/1954 | Nickerson | 260/17.6 |
| 2,769,796 | 11/1956 | Suen | 260/67.6 |
| 3,351,615 | 11/1967 | Gordon | 260/67.6 |
| 3,479,247 | 11/1969 | Bonzagni | 260/17.3 |
| 3,488,310 | 1/1970 | McCombs | 260/67.6 |
| 3,501,429 | 3/1970 | Bonzagni | 260/67.6 |
| 3,966,665 | 6/1976 | Sakata | 260/67.6 |
| 3,985,696 | 10/1976 | Aignesberg | 260/67.6 |

FOREIGN PATENT DOCUMENTS 1083328 9/1967 United Kingdom.

OTHER PUBLICATIONS

Chem. Absts., vol. 68:141,40m, Binders for Water-Soluble Baking Paints, Laky.

Primary Examiner—Edward M. Woodberry
Attorney, Agent, or Firm—John T. Synnestvedt

[57] ABSTRACT

An etherified melamine-formaldehyde resin is disclosed that has prolonged shelf life, comparatively low free formaldehyde content, and is especially adapted as a binder for glass fiber mats. The melamine-formaldehyde resin is prepared in several distinct stages including condensation in a basic aqueous solution, etherification by cooling and acidification, neutralization with triethanolamine, and final stabilization. The free formaldehyde content of the resin so produced can be adjusted by reacting it with urea.

35 Claims, No Drawings

AQUEOUS SOLUTIONS OF ETHERIFIED MELAMINE-FORMALDEHYDE RESINS WITH LONG SHELF LIFE AND LOW FREE FORMALDEHYDE CONTENT

This is a continuation, of application Ser. No. 681,844, filed Apr. 30, 1976, now abandoned.

The present invention relates to aqueous solutions of melamine-formaldehyde resins.

Methods for preparation of such resins are already known, notably from the German patent application No. 2.005.166 set forth for public inspection on Feb. 5, 1970. According to this former process an alkaline condensation of melamine with formaldehyde is effected in the presence of a polyol. The formaldehyde is obtained in the form of solid paraformaldehyde. The use of paraformaldehyde presents a significant disadvantage: the price per kg of anhydrous formaldehyde in this form, is 2 to 3 times higher than in aqueous solution form.

According to this earlier process practically anhydrous etherified tetramethylolmelamines or tetramethylolmelamines in alcohol solution are obtained.

In order to better satisfy requirements of certain applications of etherified melamine-formaldehyde resins, a way was looked for by which to manufacture aqueous solutions of such resins able to be stored for long periods of time and having low free formaldehyde content.

Consequently the purpose of the present invention is a method of preparation of a solution of melamine-formaldehyde resins by condensation in alkaline solution of formaldehyde and of melamine followed by an etherification, characterized in that, in a first phase, the melamine is caused to react with the formaldehyde by gradually adding the melamine in solid form while agitating it to an agitated solution obtained by mixing:—a solution containing 30 to 50% and preferably about 36% of formaldehyde in a quantity corresponding to a formaldehyde/melamine molar ratio ranging between 5 and 11, and preferably between 6.5 and 10;—one or several polyols in a quantity corresponding to a polyol/melamine molar ratio ranging between 3 and 5, preferably between 3.5 and 4.0; —triethanolamine in a quantity corresponding to a triethanolamine/melamine molar ratio ranging between 0.2 and 0.6, and preferably between 0.3 and 0.4 at a temperature ranging between 60° and 70° C., and preferably between 63° and 68° C., the pH after the addition of melamine ranging between 8.5 and 9.5 and preferably between 8.8 and 9.2 and the reaction is stopped by rapid cooling to a temperature ranging between 20° and 40° C., preferably between 33° and 37° C., when the cloud point is produced between 40° and 65° C., preferably between 45° and 55° C.; in a second phase etherification is effected by diminishing the pH of the reacting mix issued from the first phase by gradual addition of a pure acid or in concentrated aqueous solution, to a value rangng between 1.5 and 3.0 while maintaining the temperature of the end of the first phase, and at the end of the etherification reaction the obtained solution is neutralized by addition of a base, in a third phase a maturation is effected of the obtained solution at the end of the second phase by maintaining it for a length of time ranging between 2 and 5 hours at a temperature ranging between 50° and 90° C., preferably between 70° and 85° C., in a fourth phase the proportion of free formaldehyde is reduced in the solution at the end of the third phase to a final content of free formaldehyde not exceeding 6% by weight.

The resins obtained according to the invention are distinguished by a particularly high formaldehyde/melamine molecular ratio designated hereafter by "F/M ratio", by a good water dilutability, by a shelf life at an ambient temperature at least equal to two months and by a weight content of free formaldehyde less than 6%.

It is meant by water dilutability, the maximum quantity of water, expressed in volume, that can be added to 100 volumes of aqueous resin solution, the latter while being agitated at a temperature of 25° C., before the appearance of a cloud.

It is intended by "shelf life at an ambient temperature" that, after manufacture and storage, at a temperature ranging between about 15° C. and about 25° C., the aqueous resin solutions retain a viscosity, measured at 25° C., less than 800 cp and a water compatibility at least equal to 1200.

The limits of the respective values of the two characteristics given here above are maintained for the aqueous solutions of the resins that are the object of the invention for a shelf life of at least two months, which corresponds to the possibility of their industrial use at least during this lapse of time.

This use is very particularly that of binder for glass fiber mat in association with other products, the combination constituting a sizing for said fibers.

The present aqueous solutions yield excellent properties to the glass fiber mats such as tensile strength and suppleness.

Vis-a-vis the former method cited above, a certain number of differences are given here-below which clearly show the advantages obtained by the method of the invention.

| F/M ratio | Present invention | DAS 2.005.166 |
|---|---|---|
| | 5 to 11 & preferably 6.5 to 10 | 2 to 6 |
| Molecule of Diol/ Molecule of Melamine | 3.0 to 5.0 & preferably 3.5 to 4.0 | 0.4 to 1.2 & preferably 0.7 to 1.1 |
| Molecule of triethanolamine/ molecule of melamine | 0.2 to 0.6 & preferably 0.3 to 0.4 | not specified in the claims 0.037 (example 3) |
| Temperature of alkaline condensation | 60° to 70° C. & preferably 63° to 68° C. | 80° to 140° C. & preferably 85° to 100° C. |

After the preceding it can be seen that the resins of the present invention:—present a very large number of methylol groups per molecule of melamine,—are much more strongly etherified by a polyol, because the DAS 2.005.166 provides for putting at the time of alkaline condensation only a weak quantity of polyol and provides for adding on the other hand, for the etherification phase, a significant quantity (more than 6 and particularly 8 to 20 molecules/molecule of melamine) of an inferior mono-alcohol, for example methanol. It thus seems that this mono-alcohol is, in fact, in this patent the true agent of etherification and not the polyol.

On the contrary, in the process of the present invention, the polyol is the major agent of etherification, the other hydroxol present, but in much smaller quantities are the triethanolamine and methanol which can be present, but in small quantity, in the aqueous solution of formaldehyde. In particular no other quantity of any other alcohol is added than the one or several polyols put in at the beginning.

—include a considerable quantity of triethanolamine, which is bonded to the methylolmelamines, at the time of the etherification phase. The presence of the rest of these triethanolamines in the final resin molecule increases it solubility in water. On the other hand, the triethanolamine used in very small quantity in DAS 2.005.166 only serves primarily as a means of obtaining the necessary pH for the alkaline condensation reaction.

The addition of triethanolamine after etherification, as will be seen further on, further increases the dilutability of the solution.

According to the invention one uses as formaldehyde at the beginning, an aqueous solution of about 36%, commercially available at better prices than solid paraformaldehyde.

The operating conditions of the four phases of the method will be described in more detail here-after.

First Phase

The melamine used can be of technical quality, yet standardized at 99% by weight at least in melamine, and 99% of the particles have a diameter less than 160 microns.

Particles that are too large disturb the dissolution of the melamine in the reacting environment.

The formaldehyde used must be in aqueous solution at a weight concentration of 30 to 50%; and preferably one will use a 36% aqueous solution because of its wide availability. These solutions should, however, not include more than 10% maximum of methanol by weight and this content will be preferably less than 1% in order to avoid the presence of methoxyl groups in the etherified resin. In fact, to maximally increase the water dilutability, it is preferred that etherification be realized above all by the polyol or by the triethanolamine.

The F/M ratio will range between 5 and 11, and preferably between 6.5 and 10. Values lower than 5 would cause a weakening of properties, particularly that of tensile strength of the glass fiber mats. Further, the resins present a very low-water dilutability. Values higher than 10 would yield for the final aqueous solution, low dry extracts which have little industrial use. The successive values, 5, 6.5, 10 and 11 of the F/M ratio correspond appreciably to the dry extracts which are respectively 52, 50, 44 and 41% if one uses as a source of formaldehyde an aqueous solution of 36% by weight. The alkaline condensation reaction is effected at a pH ranging between 8.5 and 9.5 and preferably between 8.8 and 9.2. This pH is obtained by addition of triethanolamine to the reacting environment.

The quantity of triethanolamine will range between 0.2 and 0.6 and preferably between 0.3 and 0.4 molecule/molecule of melamine. This ratio will be designated here-below by the ratio TEA/M. These quantities are largely in excess in relation to that which strictly permits the adjustment of the reacting pH at the values indicated. Their purpose is, as said, to give to the resins, object of the invention, a good solubility in water.

The reaction is conducted as follows:

One first mixes the required quantities of the aqueous solution of formaldehyde, a polyol, and triethanolamine and this mix, while agitated, is brought to the reaction temperature, ranging between 60° and 70° C. and preferably between 63° and 68° C. At temperatures lower than 60° C. the dissolving of the melamine in the environment is too slow.

One then adds the melamine, little by little, in 10 to 15 minutes, maintaining the temperature and the agitation for a period which can vary from 30 to 90 minutes.

The reaction is stopped by rapid cooling at a precise moment which is determined by the cloud point of the reacting mix that is measured and that is followed during the reaction.

This cloud point is characteristic of the degree attained by the alkaline condensation. It is measured by the successive taking of samples from the reacting environment at regular time intervals. These samples are cooled by agitating them and then the temperature is noted from which a cloud is produced. This temperature, rather low at the beginning of the reaction, rises as this is continued.

The alkaline condensation reaction is thus stopped by rapid cooling when the cloud point appears between 40° and 65° C. and, preferably, between 45° and 55° C., which is produced at the end of a time period already indicated of 30 to 90 minutes.

If the reaction is stopped for a cloud point less than 40° C., the cooled reacting environment then presents a high viscosity, which makes if difficult to maintain homogeneity by agitation. Inversely, one cannot surpass a cloud point temperature higher than that of the reaction, without causing the reacting environment to opacify at the reacting temperature. The same is the case where the temperature of the reaction would be 70° C., it would be, however, very difficult to measure a cloud point temperature higher than 65° C. because the separation from the reacting temperature would be too slight.

2nd Phase: Etherification

It is the etherification phase of methylolmelamines obtained in phase 1 by the one or several polyols that were already introduced into the reacting environment. These polyols can be the following: ethyleneglycols, diethyleneglycol, triethyleneglycol, glycerol, saccharose, d-glucose. Yet the preferred diol, because of its price and its availability is ethyleneglycol.

A point of interest can be indicated that is presented by certain polyol mixes. That is, that while the mixes in various proportions of ethyleneglycol and saccharose permit regulation of the viscosity of the final resin, the saccharose tends to increase it.

The total quantity of the one or several polyols used should range between 3.0 and 5.0 and preferably, between 3.5 and 4.0 molecules per molecule of melamine. This ratio will be designated herebelow by the ratio P/M. An insufficient quantity of polyol will cause the water dilutability of the resin to diminish too much. On the other hand an excess of polyol is not useful because it does not further increase dilutability.

The acid used for the lowering of the pH of phase 1 to that of phase 2 should be preferably concentrated, so as to not uselessly lower the final dry extract of the aqueous resin solution.

One can use one of the following acids: sulfuric, hydrochloric, orthophosphoric, nitric, formic, monochloracetic.

Immediately after the alkaline condensation one cools, as already said, and while maintaining constant the obtained temperature, one acidifies the environment to a pH, the value of which should correspond to the chosen temperature. It is in these conditions of temperature and pH that the etherification reaction is effected.

These conditions should range between the following limits: from 20° C. for a pH of 1.5 to 40° C. for a pH of 3.0, or preferably, 33° C. for a pH of 1.8 to 37° C. for a pH of 2.2.

The conditions above are imperative. In fact, if one causes etherification at a pH and/or a temperature that is too high, the resin has a high viscosity and, above all, this viscosity rapidly increases during shelf life which, at the end, hinders all use of the resin soon after preparation. Inversely, if the pH and/or the temperature of etherification are too low, the viscosity of the resin is low, its water dilutability very good, but one obtains very low values of tensile strength for the glass fiber mats, which is not particularly interesting.

After the flow of the acid, one verifies at the end of a time, variable as a function of the temperature of the cloud point, that the reacting environment, previously opaque, becomes clear. The etherification reaction is then continued for a certain time at the same temperature before stopping it by neutralization.

The time periods before and after the moment when the reacting environment becomes clear will be called hereafter "opaque phase" and "clear phase" of etherification.

The following conditions should be maintained for the etherification phase: the acid should flow very regularly and for a duration ranging between 25 and 35 minutes, preferably between 28 and 32 minutes.

In fact it was found that the total duration of etherification being constant, slowing down the duration of acid flow appreciably increased the final viscosity of the aqueous resin solution.

On the other hand, the acid should flow slowly in order to maintain a constant temperature despite the heat release that this causes in the reacting environment.

The total duration of etherification, counted from the outset of the acid flow to the neutralization, should range between 50 and 180 minutes for a cloud point ranging between 40° and 65° C., respectively, and preferably between 105 and 135 minutes for a cloud point ranging between 45° and 55° C. respectively. These time limits are understood to be true for previously given values of pH and temperature.

For the pH and temperature values indicated hereabove of the cloud point it is verified that the minimal duration of the opaque phase is 50 minutes, counted from the beginning of the acid flow.

If, on the other hand, at pH and temperature values indicated hereabove for the cloud point, one surpasses 180 minutes for the total duration of etherification, one verifies that the viscosity of the resins becomes too high and that their dilutability by water becomes clearly less than 1200, almost immediately after manufacture.

Further, for these last resins, it is verified that when they are maintained at ordinary temperature, there is a rapid increase of their viscosity and an equally rapid lessening of their water dilutability.

These resins, objects of the present invention, have in fact, soon after their manufacture, a viscosity measured at 25° C. ranging between about 30 and about 200 cp, which is rather low.

Remember on the other hand, that the minimal shelf life of 2 months for these resins signifies that at the end of this time, their viscosity should not be higher than 800 cp and that their dilutability by water should not be less than 1200. Now, the normal aging of resins tends to increase their viscosity and to diminish their water dilutability, as is known.

The base employed for neutralization will be, for a first phase, totally triethanolamine, or minimally, triethanolamine at a ratio of 1/3 molecule per molecule of melamine, the rest of the neutralizing agent being, in this case, a solution of NaOH at 50% by weight.

It was verified in fact that the total neutralization by soda yields resins not easily dilutable by water, and at the limit, a precipitation at neutralization. The purpose of the addition of this new quantity of triethanolamine is, here again, to favor water solubility of the resin.

Thus a pH of 7.0 to 7.5 is attained, appreciably corresponding to the neutrality.

3rd Phase

This phase of stabilization is important because it improves two properties of glass fiber mats formed with binders prepared from aqueous solutions of the resin of the present invention.

In fact, it was found that an increase in the duration of this stabilization phase increases the flexibility index of the glass fiber mats as well as in their stress resistance.

Definition and Measure of Flexibility Index 60 rectangular test pieces measuring 25×5 cm. are cut from a glass fiber mat. On 30 of these test pieces tensile strength is measured and the average of these measures is taken.

The other 30 test pieces are each subjected one time to folding in the following conditions: a metal plate 25 cm long and 5 cm wide, of 2 mm thickness, is supplied with 2 hinges which permit folding it in two half-plates each 12.5 cm long. Each flat mat test piece is placed on this unfolded plate and two other plates of 12.5 cm ×5 cm are applied on the mat. The test piece being thus maintained tightly closed and flat between the plate supplied with hinges and the two half-plates is completely folded 180° around the hinge. The distance between the two halves of the test pieces after folding, is 10 mm, the test piece being always maintained between the plates as described.

One measures the stress resistance of 30 test pieces which have been folded and the average of these measures is determined. The loss of traction resistance after folding is then calculated in percentage.

The flexibility index is a number from 0 to 10 which is taken in the following correspondence table:

| Loss of tensile strength after folding in % | Flexibility index |
| --- | --- |
| 0 to 4 | 10 |
| 4 to 10 | 9 |
| 10 to 20 | 8 |
| 20 to 30 | 7 |
| 30 to 40 | 6 |
| 40 to 50 | 5 |
| 50 to 60 | 4 |
| 60 to 70 | 3 |
| 70 to 80 | 2 |
| 80 to 90 | 1 |
| 90 to 100 | 0 |

A small lessening in percentage of free formaldehyde of the aqueous resin solution and a gradual increase in its viscosity is verified during the stabilization phase.

This is why, in order not to increase in an undue manner, the viscosity to the detriment of the ultimate possible shelf life of the resin solution before use, the following conditions should be maintained for the stabilization phase.

the reacting mix at the end of phase 2, after its neutralization, will be heated to a temperature ranging between 50° and 90° C. and preferably between 70° and 85° C. without changing its pH;

this temperature will be maintained throughout the duration ranging between 2 and 5 hours.

Under these conditions, the aqueous resin solution remains water dilutable at a ratio of at least 12 times its volume.

If the duration of the stabilization surpasses 5 hours, for the indicated temperature values, the viscosity of the resin becomes excessive. Inversely, if the stabilization is interrupted, always for the same temperature range, before a two hour time span, the desired improvement in flexibility of glass fiber mats is no longer obtained.

4th Phase

The percentage of free formaldehyde of the aqueous resin solutions is, after the stabilization phase, even higher than the initial F/M ratio. It is on the order of 6 to 12% or even more.

Such concentrations of free formaldehyde disturb the manufacturing personnel because the vapors emitted irritate their eyes and respiratory systems.

It is thus the principal objective of this 4th phase to reduce to at least 6%, the content of free formaldehyde of aqueous resin solutions. Such concentrations no longer emit to the air irritating vapors except in a quantity tolerable to the workers.

But this operation presents, two further advantages:
one is to increase the tensile strength of glass fiber mats;
the other is to reduce the speed of increasing viscosity of stored aqueous resin solutions and thereby to contribute to prolonging this possible shelf life.

This 4th and last phase consists of adding to the aqueous solution, at the temperature of the end of phase 3, urea of a ratio of 0.6 to 1.6 and preferably 0.8 to 1.2 molecule per molecule of melamine, this quantity depending on the initial F/M ratio and consequently, on the content of free formaldehyde in the reacting environment at the end of phase 3. This molecular ratio of urea to melamine will be designated herebelow by the U/M ratio.

The urea is used in solid form, urea in pearls, because its endothermic dissolution in the water of the environment lowers the temperature and does not diminish the dry extract of the final product as would an aqueous urea solution.

The product is thus left to cool naturally for 12 to 24 hours before storing or using it.

In the following examples the concentrations given in percentages are understood to be in parts by weight, the values of the viscosity have been measured at 25° C. with a Brookfield viscosimeter, the dilutabilities were measured at 25° C. and expressed in volumes of water for 100 volumes of resin.

EXAMPLE 1

Phase I

In a 1 liter reactor, supplied with a reflux condenser, an agitator and a thermometer, one introduces 562 g of an aqueous formaldehyde solution at 36% and 0.5% methanol, 248 g of ethylene glycol and 49.5 g of triethanolamine. The temperature of the environment subjected to agitation is then brought to 65° C. When this temperature is reached, 126 g of melamine are added in 12 minutes.

The condensation at 65° C. is continued until a cloud point of 50° C. is obtained; the temperature is then rapidly lowered to 35° C.

Phase II 56 g of sulfuric acid concentrated to a pH of 2, is introduced regularly in 30 minutes and the etherification continues at 35° C. for 1 hour 30 minutes.

Phase III

At the end of etherification, the pH of the environment is adjusted to 7.2 by using 49.5 g of triethanolamine and 50 g of a sodium hydroxide solution at 50%.

The temperature is then brought to 70° C. which is maintained for 5 hours.

Phase IV

At the end of these 5 hours, 48 g of urea are introduced during the cooling of the resin at a temperature of about 60° C.

The resin obtained has the following characteristics:

F/M ratio = 6.75
P/M ratio = 4
TEA/M = 0.33
number of molecules of triethanolamine, added after etherification, per molecule of melamine: 0.33
U/M ratio = 0.8
dry extract: 50.1%
viscosity: 94 cp
free formaldehyde: 1.9%
dilutability: infinite (>2,000)
pH: 7.2
after 2 months storage:
    dilutablity: infinite (>2,000)
    viscosity: 160 cp

PREPARATION OF SIZING

Starch paste: an aqueous dispersion is prepared of starch paste from potatoes modified by ethylene oxide treatment, having a concentration of 8% calculated in the form of anhydrous starch. Vapor is bubbled in this dispersion until its temperature is 98° C. Vapor bubbling is then continued for 20 minutes and the dispersion is left to cool. When the temperature is lowered to 25°–30° C., the paste is ready to be used.

One mixes with 110 kg of paste, a quantity of aqueous solution of the preceding melamine-formaldehyde so that the resin corresponds to a dry weight of 1.2 kg.

One mixes with the preceding mixture an emulsion of a homopolymer of polyvinyl acetate, which polyvinyl acetate is plasticized by dibutyl phtalate to the extent of 50% of pasticizer per weight of resin. 1.378 kg of a 58% emulsion, based on the dry weight of the plasticized homopolymer, is mixed with 1.378 kg (or an equal weight) of water and the resulting mixture is added to the mixture of starch and melamine formaldehyde resin formed in the preceding step.

This diluted emulsion is added to the preceding mix. The total is homogenized by agitation for 10 minutes and constitutes the concentrated sizing.

When used, this concentrated sizing is diluted by a quantity of water such that the sizing finally used has a dry extract of 2.2%.

PREPARATION OF A GLASS FIBER MAT

A mat of unbonded discontinuous glass fibers is used, hereafter designated as "uncured mat." This mat was obtained by distributing in regular fashion on a conveyor belt of metallic cloth, discontinuous glass fibers obtained by steam attenuation of molten glass streams which flow from holes placed at the lower section of a platinum bushing. These glass fibers have an average diameter of about 16 microns. The uncured mat used has a weight of $80 \pm 5$ g/m$^2$.

The uncured mat in the form of a continuous ribbon placed between two conveyor belts of metallic cloth is immersed in the preceding prepared sizing.

Always in a continuous fashion, the excess sizing retained by the uncured mat is extracted by means of a vacuum box placed below the lower belt. The vacuum is regulated in the box so that the mat retains, after drying, 20% by weight of dry binder in proportion to the total weight of glass and dry binder.

The uncured mat, sized and dried is then continuously passed for 2 minutes in an air circulation oven, heated to 145° C.

The finished mat is then measured for the following characteristics:

tensile strength: 5.5 kg/cm
flexibility index: 7

EXAMPLE 2

A melamine formaldehyde resin is prepared according to the operative mode of Example 1, using the quantities of materials indicated hereafter:

formaldehyde at 36%: 666 g
ethylene glycol: 248 g
triethanolamine: 49.5 g
melamine: 126 g
concentrated sulfuric acid: 56 g
aqueous solution of sodium hydroxide at 50%: 50 g
urea: 48 g
treithanolamine: 49.5 g The resin obtained presents the following characteristics:

F/M ratio: 8.0
P/M ratio: 4.0
TEA/M ratio: 0.33
number of molecules of triethanolamine, added after etherification, per molecule of melamine: 0.33
U/M: 0.8
dry extract: 47.8%
viscosity: 70 cp
free formaldehyde: 4.0%
dilutability: infinite (>2,000)
pH: 7.2
After two months' storage:
  dilutability: infinite (>2,000)
  viscosity: 130 cp By using the preceeding resin, a paste is prepared that is applied on the uncured mat which is then dried in an oven according to the operative mode described in Example 1.

On the final mat the following characteristics are measured:

tensile strength: 5.6 kg/cm
flexibility index: 7

EXAMPLE 3

A melamine formaldehyde resin is prepared according to the operative mode of Example 1, using the quantities of material indicated hereafter:

formaldehyde at 36%: 750 g
ethylene glycol: 248 g
triethanolamine: 49.5 g melamine: 126 g
concentrated sulfuric acid: 56 g
triethanolamine: 49 g
aqueous solution of sodium hydroxide at 50%: 50 g
urea: 48 g The characteristics of this resin are the following:
F/M ratio: 9.0
P/M ratio: 4
TEA/M ratio: 0.33
number of triethanolamine molecules, added after etherification per molecule of melamine: 0.33
U/M ratio: 0.8
dry extract: 45.6%
viscosity: 52 cp
free formaldehyde: 5.4%
dilutability: infinite (>2,000)
pH: 7.2
After two months' storage:
  dilutability: infinite (>2,000)
  viscosity: 100 cp By using the preceeding resin, a sizing is prepared tht is applied to the uncured mat which is then dried in an oven according to the operting method described in Example 1.

The finished mat is then measured for the following characteristics:

tensile strength: 5.9 kg/cm
flexibility index: 8

EXAMPLE 4

A formaldehyde-melamine resin is prepared according to the operating mode of Example 1, using the quantities of material indicated hereafter:

formaldehyde at 36%: 666.5 g
ethylene glycol: 198.5 g
triethanolamine: 39.5 g
melamine: 101 g
concentrated sulfuric acid: 45 g
triethanolamine: 39.5 g
triethanolamine: 39.5 g
aqueous solution of sodium hydroxide at 50%: 40 g
urea: 38.5 g The characteristics of this resin are the following:

F/M ratio: 10.0
P/M ratio: 4.0
TEA/M ratio: 0.33
number of triethanolamine molecules, added after etherification per molecule of melamine: 0.33
U/M ratio: 0.8
dry extract: 43.2%
viscosity: 44 cp
free formaldehyde: 5.7% dilutability: infinite (>2,000)
pH: 7.2
After two months' storage:
  dilutability: infinite (>2,000)
  viscosity: 92 cp By using the preceedingly prepared resin a sizing is prepared, then one manufactures a mat according to the operative mode of Example 1. On this mat the following characteristics are measured:

stress-resistance: 6.2 kg/cm
flexibility index: 7

If one compares the stress resistances of the mats obtained in Examples 1, 2, 3, and 4, the progression of this characteristic in relation to the rise of F/M molecule is verified:

| EXAMPLE # | F/M Ratio | Tensile strength of mats in kg/cm |
|---|---|---|
| 1 | 6.75 | 5.5 |
| 2 | 8.0 | 5.6 |
| 3 | 9.0 | 5.9 |
| 4 | 10.0 | 6.2 |

EXAMPLE 5

In a reactor supplied with vigorous agitation and heating means, one proceeds, at a temperature of 65° C., to alkaline condensation of formaldehyde and melamine by using the following quantities of material:

ethyleneglycol: 248 g (4 mol.)
triethanolamine: 49.5 g (0.33 mol.)
melamine: 126 g (1 mol.)
formaldehyde: quantites indicated herebelow.

The aqueous solution of formaldehyde at 36% containing 0.5% methanol is placed in a reactor, then glycol and triethanolamine are added and this is heated to the reaction temperature. The melamine is then added in 12 minutes.

For increasing quantities of aqueous formaldehyde solutions the following verifications are made:

F/M ratio: 2.5, even after 3 hours at 65° C. the reacting environment remains cloudy, by continuously heating there results a solidifying of the resin.

F/M ratio: 2.9 at the end of 90 minutes at 65° C., the reacting mix is clear. The operations are continued corresponding to phases 2,3 and 4 according to the conditions indicated in Example 1. The final resin has no dilutability.

F/M ratio: 4.0, the reacting environment of the alkaline condensation becomes clear after 50 minutes at 65° C. The preparation is finished according to the operative mode of Example 1. The resin obtained has a water dilutibility of only 1.000.

With this last resin a sizing is prepared and one manufactures a glass fiber mat according to the specification of Example 1. The tensile strength of this mat is only 4.2 kg/cm.

This example shows the disadvantages of an F/M ratio <5.0 which are thus: lack of water dilutability of the resins and weakening of the tensile strength of the glass fiber mat.

EXAMPLE 6

Three resins are prepared according to all the conditions indicated in Example 1, except for the cloud point which is 12° C. for all the preparations. Further, one varies from one preparation to the other, the temperature of alkaline condensation. The following results are obtained:

1st preparation: Condensation temperature 60° C. Condensation duration is 45 minutes. The obtained resin has a viscosity of 14 cp and a dilutability higher than 2,000.

2nd preparation: Condensation temperature 65° C. The condensation duration is 35 minutes. The resin has a viscosity of 12 cp and a dilutability higher than 2,000.

3rd preparation: Condensation temperature 70° C. The condensation duration is 23 minutes. The resin has a viscosity of 11 cp and a dilutability higher than 2,000.

But at the end of only 15 days storage, these three resins have such increased viscosities that they have the consistency of a gel.

This example shows the necessity of a sufficiently high cloud point in order to obtain a good shelf life of the resins. One should also note, by comparison with Example 1, the lowering of the viscosity which results in the lowering of the temperature of the cloud point.

EXAMPLE 7

A melamine-formaldehyde resin is prepared according to the operative mode of Example 4 by using the quantities of material indicated hereafter:

formaldehyde at 36%: 665.5 g
ethylene glycol: 198.5 g
triethanolamine: 39.5 g
melamine: 101 g
concentrated sulfuric acid: 45 g
triethanolamine: 39.5 g
aqueous solution of sodium hydroxide at 50%: 40 g
urea: 57.5 g Yet the operative mode used differs from that of Example 4 in that one pushes the alkaline condensation to a cloud point of 62° C. instead of 50° C., in that the etherification duration is 3 hours 10 minutes instead of two hours and in that the stabilization phase has a duration of 3 hours at a temperature of 85° C. instead of 5 hours at 70° C.

The characteristics of this resin are the same as those of the resin of Example 4, except for the following:

U/M ratio: 1.2
dry extract: 43.3%
viscosity: 80 cp
free formaldehyde: 4.9%
dilutability: 1900
After two months' storage:
  dilutability: 1400
  viscosity: 210 cp A sizing is prepared by use of the preceeding resin and the operative mode of Example 1 is used to manufacture the mat. The following characteristics are measured on this mat:

tensile strength: 6.7 kg/cm.
flexibility index: 6

This example shows the possibility of preparing a resin according to the invention by stopping the alkaline condensation at a cloud point of 62° C. It further shows that one should adjust the total etherification duration as a function of the cloud point value.

EXAMPLE 8

A resin is prepared according to all the specifications of Example 4, except that one uses a TEA/M=0.1 instead of 0.33 ratio at the time of alkaline condensation.

The obtained resin has practically no dilutability (<50) and a viscosity of 275 cp.

This example illustrates well, by comparison with Example 4, the disadvantage there is in using, at the time of alkaline condensation, a TEA/M ratio that is too weak, that is, the important role of triethanolamine which is to give to the resin a good solubility in water and a high water dilutability.

EXAMPLE 9

The resin is prepared according to the operative mode of Example 4 but by using for the alkaline condensation sodiumhydroxide as catalyst instead of triethanolamine. The quantites of material used are the following:

formaldehyde at 36%: 666.5 g (8 mol.)
ethyleneglycol: 198.5 g (3.2 mol.)
aqueous solution of sodium hydroxide at 50%: 1 ml.
melamine: 101 g (0.8 mol.)
concentrated:
sulfuric acid: 10 ml.
triethanolamine: 39.5 g (0.264 mol.)
aqueous solution of sodium hydroxide at 50%: 7 ml The resin obtained after the etherification phase and neutralization has practically no water dilutability (<1000). If one proceeds to stabilization by heating in the conditions indicated in Example 4, the resin is transformed into a gel.

This example shows, as the preceeding Example 8, the important role of the triethanolamine introduced to the alkaline condensation phase, this role being to bring a good solubility in water and a good dilutability by water of the resin, which, here, cannot be obtained with sodium hydroxide.

EXAMPLE 10

This example illustrates the use of a certain number of different polyols of ethylene glycol in the synthesis of the resins of the present invention.

The preparations are made according to all the conditions described in Example 1, except for the nature and quantities of polyols and for certain particularities for each polyol which will be indicated in the following table:

| Nature & Quantity of polyols in g. mol | Particularities the preparations | Results & Observations |
|---|---|---|
| Glycerol : 4 mol | 3 hr of maturation at 75° C. (Phase III) | Dilutability: 2,000 Viscosity: 90 cP Stable 2 mths storage |
| Diethyleneglycol : 4 mol | | Dilutability: 2,000 Viscosity: 94 cP Stable 2 mths storage |
| d-glucose : 0.4 ethyleneglycol : 3.0 | Cloud point of 47° C. obtained after 70 minutes at 65° C. (Phase I) | Dilutability: 2,000 Viscosity: 112 cP Stable 2 mths storage |
| triethyleneglycol : 4 mol | Cloud point 47° C. obtained after 120 mn at 65° C. (Phase I) | Dilutability: 2,000 Viscosity: 98 cP Stable 2 mths storage |

EXAMPLE 11

Three preparations of melamine-formaldehyde resins are effected with the quantities of materials hereafter and according to the general operative mode of the preceeding examples:

formaldehyde at 36%: 583.3 g (7 mol)
triethanolamine: 49.5 g (0.33 mol)
melamine: 126 g (1 mol.)
concentrated sulfuric acid: 56 g
triethanolamine: 49.5 g (0.33 mol)
aqueous solution of sodium hydroxide at 50%: 50.0 g
urea: 48.0 g (0.8 mol)

The alkaline condensations are made at 65° C. and interrupted for a cloud point at 52° C. The etherifications are made at 2.0 pH and at a temperature of 30° C.

These three preparations differ by the mix of polyols used:

| Preparations | | A | B | C |
|---|---|---|---|---|
| Mix of Polyol | -Sucrose (saccharose) | 342 g | 171 g | 86 g |
| | -Ethylene glycol | 0 | 124 g | 186 g |

Resin A was etherified only 40 minutes because its viscosity was already very high, resins B and C were etherified for a total period of 90 minutes.

After neutralization, the three preparations were heated (stabilized) 5 hours at 70° C. Yet one ought to add 95 g of water to Resin A during heating because of its thickness.

The characteristics of the resins finally obtained are the following:

| | | A | B | C |
|---|---|---|---|---|
| F/M ratio | | 7.0 | 7.0 | 7.0 |
| Molecular ratio | Sucrose melamine | 1.0 | 0.5 | 0.25 |
| | ethyleneglycol melamine | | 2.0 | 3.0 |
| TEA/M ratio number of molecules of triethanolamine | | 0.33 | 0.33 | 0.33 |
| added after etherification, per molecule of melamine | | 0.33 | 0.33 | 0.33 |
| U/M ratio | | 0.8 | 0.8 | 0.8 |
| dry extract in % | | 57.8(*) | 55.6 | 54.0 |
| viscosity in cPo | | 2100 | 1100 | 125 |
| dilutability | | 1800 | >2000 | >2000 |

(*)includes water added during maturation

This example illustrates the possibility of obtaining resins of viscosities that are very different and regulable as desired by adding relative proportions of sucrose and ethyleneglycol. In establishing the relative proportions of the two polyols in the three resins A, B and C above it was considered that the sucrose, including eight alcoholic hydroxyl groups per molecule, should be employed in molecular quantities four times less than the diol. Finally it is evident that only weak portions of sucrose can furnish interesting resins for general practice.

EXAMPLE 12

One proceeds to three preparations of resin according to the operative mode and with the quantities of material indicated in Example 1 except for the quantities of ethyleneglycol.

In a first preparation one uses a P/M ratio of only 2.0. One verifies during the etherification phase a solidifying of the resins which cannot be stablized by the addition of water.

In a second preparation one uses a P/M ratio=2.5. There is no solidification during etherification but the final resin has a water dilutability of only 1,000.

In a third preparation one uses a P/M ratio of 3.0. Not one difficultly is encountered in the preparation of the resin which, once terminated, presents an infinite water dilutability (>2,000).

This example shows the necessity of using a P/M ratio at least equal to 3.0 in order to have a good water dilutability of the resins according to the invention.

EXAMPLE 13

One proceeds to two preparations of resin under all the conditions described in Example 1, except those concerning pH and temperature of the etherification phase.

In a first preparation one proceeds to etherification at a pH of 4 and a temperature of 40° C. The obtained resin presents a viscosity and a normal dilutability the day after its manufacture. However, twenty days later, the viscosity of the resin has so increased that it is transformed into a type of gel at ambient temperature.

In a second preparation one proceeds to etherification at pH 1.5 and at a temperature of 20° C. The day after its manufacture the resin presents a water dilutability higher than 2000 and a viscosity of 15 cp. At the end of two months storage the water dilutability is always higher than 2000, the viscosity is 40 cp.

With this second resin one proceeds to the preparation of a sizing and the the manufacture of a glass fiber mat according to the specifications of Example 1. One measures tensile strength which, for this mat, is only 4.0 kg/cm.

By comparison with the results indicated in Example 1, the present example shows the disadvantages that one encounters if one departs from, for the etherification phase, the domain defined in the text of the present patent for the pH values and temperature values.

EXAMPLE 14

One proceeds to the preparation of two resins according to all the specifications of Example 4, except for the duration of the etherification phase.

In the first preparation the total duration of etherification, acid flow included, is only 60 minutes for a cloud point of 50° C. instead of 90 minutes for this same cloud point. The final viscosity of this resin is only 23 cp, its dilutability by water is higher than 2000.

One proceeds with this resin to the preparation of a sizing, then to the manufacture of a mat of glass fibers according to the specification of Example 1.

A stress resistance of only 4.9 kg/cm is measured on this mat.

In the second preparation one prolongs the etherification to a total duration of 180 minutes for a cloud point which is always 50° C. The final resin obtained presents a viscosity of 285 cp and a water dilutability of 1500.

After two months' storage one measures on the resin:

dilutability: 600
viscosity: 1050 cp

This example shows, by comparison with the results of Example 4, the disadvantages that one encounters in not conforming, for the etherification reaction, to the limits indicated for its total duration for a given cloud point.

EXAMPLE 15

One prepares a resin according to the operative mode of Example 4 except that one uses 60 g of aqueous solution of hydrochloric acid at 35.5% instead of 45 g of concentrated sulfuric acid.

The characteristics of this resin are, apart from the molecular ratios of the different reactants which are those of Example 4:

dry extract: 43.3%
viscosity: 35 cp
free formaldehyde: 5.5%
dilutability: infinite (>2000)
viscosity: 30 cp
After two months' storage:
  dilutability: infinite (>2000)
  viscosity: 55 cp One proceeds by using this resin for the preparation of a sizing then, to the manufacture of a mat according to the specifications of Example 1. One measures on this mat:

tensile strength: 6.0 kg/cm
flexibility index: 7

One obtains analogous results of one uses, according to the same operative mode and in the same stochiometric proportions, orthophosphoric, nitric, formic or monochloracetic acids to replace hydrochloric acid.

This example shows that one can indifferently use these various acids or sulfuric acid in the method of the present invention.

EXAMPLE 16

One prepares a resin according to all the indications of Example 4 except that one effects the neutralization just to a pH of 7.2, after etherification, solely by an aqueous solution of sodium hydroxide at 50%, instead of using 0.33 mol. of triethanolamine, with 40 g of aqueous solution of sodium hydroxide. One verifies during the stabilization at 70° C. (phase III) a solidification of the resin after 2 hours. This resin is no longer soluble by addition of water.

This example shows the necessity of using, at least in part, the triethanolamine for the neutralization of the resin after the etherification phase. It thus shows, by comparison with Examples 8 and 9, that the triethanolamine plays an essential role for solubility in water of the resin not only at phase I (catalyst of the alkaline condensation) but also at the end of phase II (etherification) at the time of its neutralization.

EXAMPLE 17

This example shows the improvements brought to the resins by stabilization (phase III).

One prepares four resins according to all the conditions of Example 1 except that the etherification temperature is 30° C. instead of 35° C. for all the preparations.

Further, one proceeds to the stabilization (phase III) of these resins for the increasing durations from one preparation to the other.

With each resin one prepares a sizing and one manufactures a mat of glass fibers according to the operative mode of Example 1.

One obtains the results indicated in the following table:

|  | Resin with no maturation duration | Resin with maturation duration of 1 hour | Resin with maturation duration of 4 hours | Resin with maturation duration of 5 hours |
|---|---|---|---|---|
| Tensile strength of glass fiber mats in kg/cm | 4.2 | 4.6 | 4.8 |  |
| Suppleness index of glass fiber mats | 5 | 6 | 8 |  |
| Viscosity of aqueous resin solution after manufacture in cPo | 41 | 53 | 115 | 245 |

This example shows further the very rapid increase of the viscosity after about 4 hours of stabilization. This is why one should continue this operation during a limited time in order that the resins remain usable in industrial practice.

EXAMPLE 18

This example illustrates the improvements brought by the addition of urea to the resins after the stabilization phase.

One prepares a resin according to all the specifications of Example 4 but not adding urea at the end of the manufacture.

By use of the resin thus obtained one prepares a sizing and one manufactures a mat of glass fibers according to the operative mode of Example 1.

One obtains, by comparison with the resin of Example 4, the following results:

|  | Resin of Example 4 | Same resin without addition of urea |
|---|---|---|
| Free formaldehyde in % | 5.7 | 11.0 |
| Tensile strength of glass fiber mat in kg/cm | 6.2 | 5.7 |
| Viscosity after manufacture in cP. | 44 | 55 |
| Viscosity two months after manufacture in cP | 92 | 185 |

The resins obtained conforming to the invention are advantageous for binding thin glass fiber mats, in particular of a thickness less than 4 mm, to which these (resins) give good qualities of flexibility and stress resistance.

We claim:

1. A process for preparing a solution of melamine-formaldehyde resin etherified by condensation in alkaline solution of formaldehyde and melamine followed by an etherification, comprising the steps of:
    (a) adding melamine to a solution of between 30% and 50% formaldehyde in the presence of a polyol and triethanolamine and at a temperature of between 60° and 70° C., the formaldehyde/melamine molar ratio being between 5 and 11, the polyol/melamine molar ratio being between 3 and 5 and the triethanolamine/melamine molar ratio being between 0.2 and 0.6;
    (b) terminating the condensation reaction when a cloud point appears at between 40° C. and 65° C. for the reactant solution, this termination carried out by cooling to a temperature between 20° C. and 40° C.;
    (c) etherifying the aqueous condensate solution by acidifying the solution while maintaining the temperature thereof between 20° C. and 40° C.;
    (d) terminating the etherification by neutralizing the cooled acidic solution with a base that includes triethanolamine of a molar ratio of at least one-third molecule per molecule of melamine; and
    (e) stabilizing the neutralized solution by maintaining it at a temperature of between 50° C. and 90° C.

2. A process according to claim 1 additionally comprising the step of reducing the free formaldehyde content of the stabilized solution by the addition of urea.

3. A process according to claim 2 wherein the free formaldehyde of the stabilized solution is reduced to less than 6% by weight by the addition of urea and then left to cool naturally for 12 to 24 hours.

4. A process according to claim 2 wherein urea in solid form is added in a quantity ranging from 0.6 to 1.6 mole per mole of melamine.

5. A process according to claim 4 wherein the urea is added in a quantity ranging between 0.8 and 1.2 mole per mole of melamine.

6. A process for the preparation of an etherified melamine-formaldehyde resin comprising the sequential steps of:
    (a) adding melamine to an alkaline solution of between 30% and 50% formaldehyde in the presence of a polyol and triethanolamine and at a temperature of between 60° C. and 70° C., the formaldehyde/melamine molar ratio being between 5 and 11, the polyol/melamine molar ratio being between 3 and 5, and the triethanolamine/melamine ratio being between 0.2 and 0.6;
    (b) terminating the condensation reaction when a cloud point appears at between 40° C. to 65° C. for the reactant solution, this termination carried out by cooling to a temperature between 20° C. and 40° C.;
    (c) etherifying the aqueous condensate solution by acidifying the solution to a pH between 1.5 and 3 while maintaining the temperature thereof between about 25° C. to about 40° C.;
    (d) terminating the etherification by neutralizing the cooled acidic solution with a base that includes triethanolamine in a molar ratio of at least one part triethanolamine to three parts melamine;

(e) stabilizing the neutralized solution by heating it to a temperature between about 50° C. to about 90° C. for a period of time in excess of about 2 hours; and (f) reducing the free formaldehyde content of the stabilized solution to less than 6%.

7. A process according to claim 6 wherein the formaldehyde/melamine molar ratio is between 6.5 and 10.

8. A process according to claim 6 wherein the polyol/melamine molar ratio is between 3.5 and 4.

9. A process according to claim 6 wherein the triethanolamine/melamine molar ratio is between 0.3 and 0.5.

10. A process according to claim 6 wherein the condensation reaction is conducted with a formaldehyde solution of 34% to 38% and at a pH of between about 8.5 and 9.5.

11. A process according to claim 10 wherein the temperature is between 63° C. and 68° C. and the pH is between 8.8 and 9.2.

12. A process according to claim 6 wherein the condensation reaction is terminated when the cloud point is between 45° C. and 50° C.

13. A process according to claim 6 wherein the condensation reaction is terminated by rapidly cooling the condensation reactants to a temperature in a range of from 30° to 40° C.

14. A process according to claim 13 wherein the condensation reaction is terminated by rapidly cooling the condensation reactants to a temperature in a range of from 33° C. to 37° C.

15. A process according to claim 6 wherein the etherification reaction is initiated by the gradual addition of a concentrated acid to the condensation reactants until the pH is lowered to between about 1.5 and 3.

16. A process according to claim 6 wherein the acidification is conducted over a time interval ranging from between 25 to 35 minutes.

17. A process according to claim 16 wherein the acidification is conducted over a time interval ranging from between 28 to 32 minutes.

18. A process according to claim 16 wherein the pH of about 1.5 is utilized for etherification temperatures of about 25° C., a pH of about 3 is utilized for etherification temperatures of about 40° C., and pHs between about 1.8 and 2.2 are utilized for etherification temperatures in a range from about 33° C. to about 37° C.

19. A process according to claim 18 wherein the duration of the etherification reaction, timed from the beginning of the introduction of the acid, is in a range of from about 50 to about 180 minutes.

20. A process according to claim 19 wherein the time duration of the etherification reaction is in a range of from 105 to 135 minutes.

21. A process according to claim 20 wherein the etherification reaction is terminated when a cloud point temperature of between about 45° C. and 55° C. is reached.

22. A process according to claim 6 wherein the etherification reaction is terminated by neutralizing the pH of the reactants through the addition of triethanolamine.

23. A process according to claim 6 wherein the etherification reaction is terminated by partially neutralizing the pH of the reactants by the addition of triethanolamine and completing the neutralization by the addition of sodium hydroxide.

24. A process according to claim 6 wherein the stabilization is achieved by maintaining the reactants at a temperature in a range of from 50° C. to 90° C. for a period of time ranging from two to five hours.

25. A process according to claim 24 wherein the stabilization temperature is maintained between 70° C. and 85° C.

26. A process according to claim 6 wherein the melamine is added to the condensation reaction mixture in a period of time ranging from about ten to about fifteen minutes.

27. A process according to claim 6 wherein the polyols are ethylene glycol, diethylene glycol, triethylene glycol, glycerol, saccharose or d-glucose.

28. A process according to claim 27 wherein the polyol is ethylene glycol.

29. A process according to claim 28 wherein the polyol is a mixture of ethylene glycol and saccharose.

30. A process according to claim 6 wherein the aqueous condensation solution is acidified by the addition of sulfuric acid, hydrochloric acid, orthophosphoric acid, nitric acid, formic acid, or monochloracetic acid.

31. A process according to claim 6 wherein the aqueous condensation solution is acidified over a period of time of between 25 and 35 minutes.

32. A process according to claim 31 wherein the aqueous condensation solution is acidified over a period of time of between 28 and 32 minutes.

33. Aqueous solutions of etherified melamine-formaldehyde resin prepared by the process of claim 6 and further characterized in that the dry extracts are between about 41% and about 52% by weight, the F/M molar ratio is between 5 and 11, the P/M molar ratio is between 3 and 5, and the U/M ratio is between 0.6 and 1.6.

34. Aqueous solutions according to claim 33 wherein the free formaldehyde content is less than 6%.

35. Aqueous solutions according to claim 34 wherein the solutions, when stored for period of about two months at 25° C., have viscosities of less than about 800 centipoise and water compatibilities of at least about 1,200.

* * * * *

UNITED STATES PATENT AND TRADEMARK OFFICE
CERTIFICATE OF CORRECTION

PATENT NO. : 4,183,832
DATED : January 15, 1980
INVENTOR(S) : Jean-Paul Meunier et al.

It is certified that error appears in the above—identified patent and that said Letters Patent is hereby corrected as shown below:

Column 4, line 23, "if" should read -- it --.

Column 10, line 33, "tht" should read -- that --.

Column 14, line 59, after "U/M ratio" the number in column A "57.8" should read -- 57.3 --.

Column 16, line 44, "of" should read -- if --.

Column 19, line 27, after "30°" insert -- C --.

Signed and Sealed this

Eighth Day of July 1980

[SEAL]

Attest:

SIDNEY A. DIAMOND

Attesting Officer

Commissioner of Patents and Trademarks